2,781,920

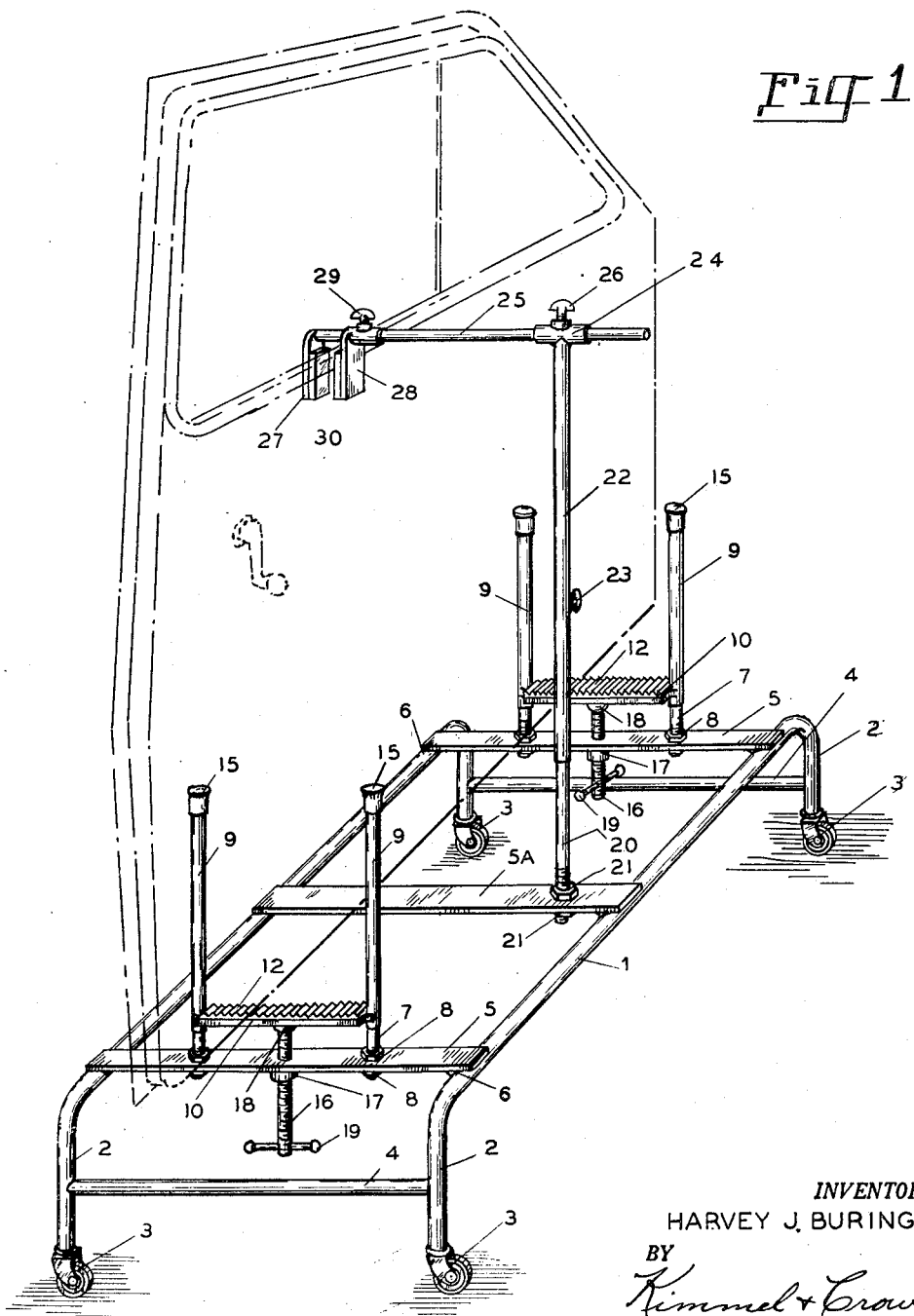

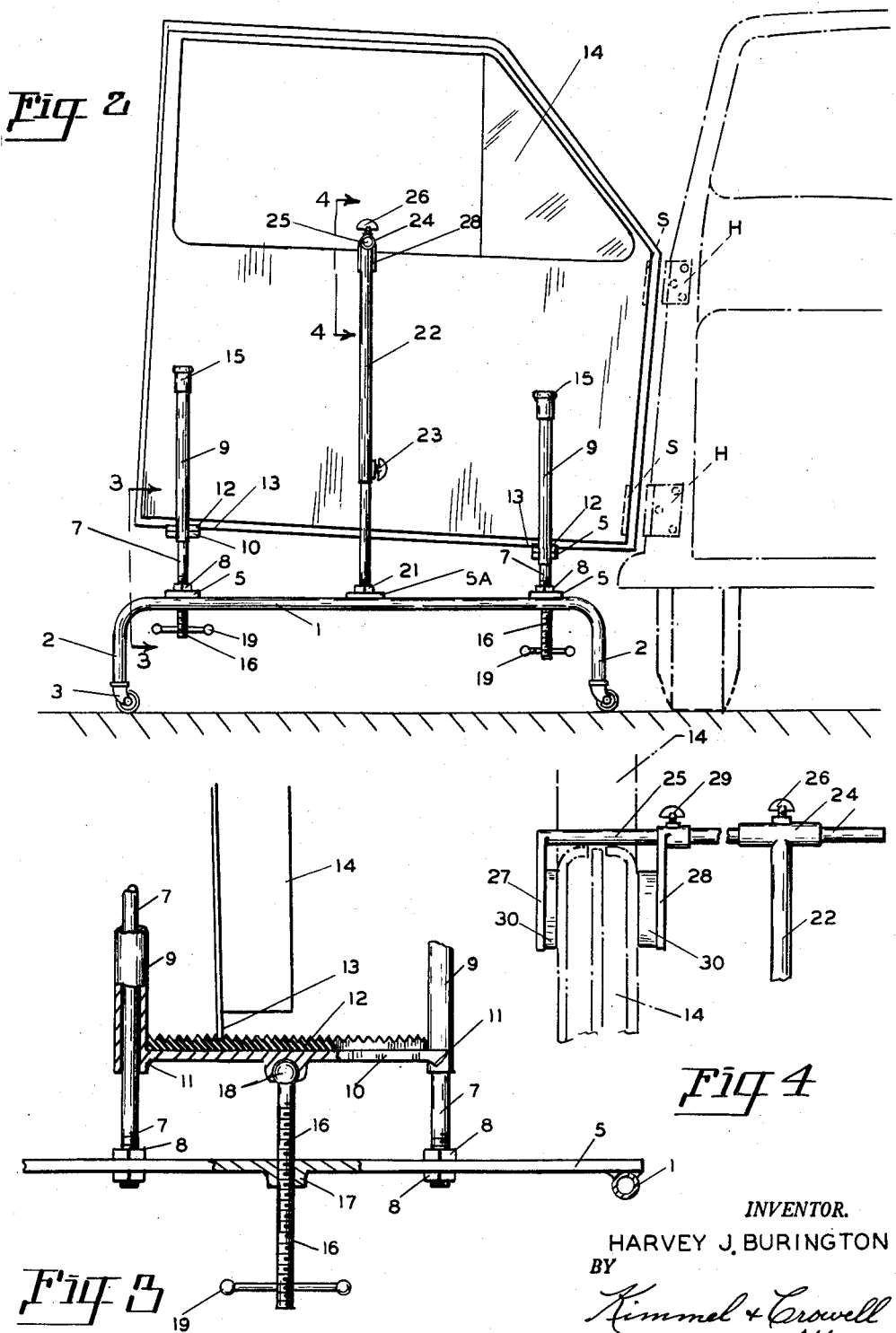

ADJUSTABLE SUPPORTING RACKS

Harvey J. Burington, Salem, Oreg.

Application March 4, 1954, Serial No. 414,077

2 Claims. (Cl. 214—1)

My invention relates to an improvement in adjustable supporting racks and is particularly adapted for supporting automobile doors while installing the same on the body of the vehicle.

The primary object of my invention is to provide a supporting rack for supporting an automobile door wherein the door can be adjusted to any horizontal or vertical plane so as to correspond with the location of the hinges on the vehicle.

Heretofore in the installing of automobile doors, one workman had to support and hold the door while another workman applied the hinges to the door and to the body of the vehicle.

With my new and improved adjustable supporting rack, the door is placed on adjustable base plates forming part of the rack, and the door is supported in a vertical position by an upwardly extending adjustable bracket arm forming part of the rack. The rack is supported upon wheels and can be moved up to the side of the vehicle bringing the edge of the door adjacent the hinges. The operator then can adjust the base plates to align the hinges of the door and the vehicle. The door can be adjusted in regards to the vertical axis by a separate supporting bracket so that the door will align with its proper position relative to the vehicle.

These and other incidental objects will be apparent in the drawings, specification and claims.

Referring to the drawings:

Figure 1 is a perspective view of my new and improved adjustable rack for supporting automobile doors, the door being indicated in broken lines.

Figure 2 is a side view of the rack, having a door mounted thereon, a fragment of the vehicle body being illustrated by broken lines.

Figure 3 is a fragmentary vertical section, taken on line 3—3 of Figure 2, illustrating the method of adjusting the supporting base plates.

Figure 4 is a fragmentary side view of the bracket for holding the door in a vertical position, the door being indicated in broken line position.

Referring more specifically to the drawings:

My new and improved adjustable rack for supporting automobile doors consists of horizontal frames 1 turned down into vertical legs 2, the said legs being mounted upon caster wheels 3. The legs 2 are spaced apart by the horizontal bars 4 forming part thereof, while the frames 1 are spaced apart by the flat bars 5, which are welded to the said frames at 6. Vertical rods 7 are connected to the transverse flat bars 5 by way of the locking nuts 8.

Slidably mounted to the rods 7 are tubular members 9. The lower ends of the tubular members are connected together by the transverse flat bar or base 10 by way of welding 11. A corrugated rubber pad 12 is affixed to the top surface of the flat bar or base 10 by any suitable means and is adapted to receive the lower edge 13 of the door 14, as best illustrated in Figure 3. The upright tubular standards 9 assist in the guiding and holding of the door on the base, preventing the same from being dislodged therefrom.

Rubber knobs 15 are mounted to the top of the standards 9 and are adapted to protect the door from damage. The elevation of the flat bar or base 10 is determined by the adjusting screw 16, which is threaded through the nut 17 forming part of the flat bar 5. A ball and socket connection 18 is adapted to connect the base 10 with the upper end of the adjusting screw 16, as best illustrated in Figure 3. The usual handle 19 is associated with the threaded screw 16 and is adapted to rotate the same.

Extending upwardly from the flat bar 5A is a standard 20, which is connected to the flat bars by the locking nuts 21. Slidably mounted on the standard 20 is a tubular standard 22. This standard is adjustable for height by the locking wing nut 23. Formed on the top of the standard 22 is a transverse or horizontal tube 24 through which the horizontal arm 25 is adapted to slide and be locked in any desired position by the locking wing nut 26.

Forming part of the arm 25 is a holding jaw 27. An adjustable holding jaw 28 is slidably mounted on the arm 25 and can be locked at any desired position by the wing nut 29. Rubber pads 30 may be applied to the jaws 27 and 28 for protecting the finish of the door 14.

I will now describe how my new and improved door holding rack is used in the placing of a door relative to the hinges on the vehicle. The door is placed on the adjustable supporting bases or flat bars 10, as indicated particularly in Figure 2. The jaw 27 of the arm 25 is placed through the window opening, coming to bear on the outside of the window sill. The adjustable jaw 28 is then moved up against the sill on the inside of the door and the wing nut 29 tightened. The rack and the door is then moved up to the side of the vehicle, as indicated in Figure 2. The adjusting screws 16 are threaded through the nuts 17, raising or lowering the adjustable bases 10 so that the edge of the door will align itself with the side of the vehicle and the hinges H made to register with their seats S on the door, referring to Figure 2.

The arm 25 is adjusted within the tube 24 of the standard 22 so as to pull the door one way or the other from a vertical line, so as to line up with the hinges on the vehicle. After the hinges are aligned, the workman can then connect them in the usual manner.

From the above, it can be readily understood how easy it is to adjust the height of the door and the angle of the base of the door depending upon the position of the hinges on the body of the vehicle. The vertical position of the door can also be determined by the arm 25 associated with the standard or pedestal 22. It is possible in many instances with my new and improved rack that the same can be adjusted to the door before the same is removed from the body of the vehicle, left in this adjusted position while the door is being repaired and after the door is repaired, it can be placed on the rack and replaced with very little adjustment required.

The vertical standards 7 and the standard 20 are mounted to the flat bars 5 and 5A by lock nuts 8 and 21 so that they can be removed for shipping purposes.

What is claimed is:

1. A rack for use in hanging and removing vehicle doors, comprising a wheeled base, a pair of U-shaped door supporting members, each member being formed of a pair of tubular vertical members, a horizontal connecting bar fixed between said tubular members, serrated cushioning means on the upper side of said connecting bar, a pair of upright guides for each supporting member fixed to said base and slidably engaging in said tubular members, means threadably carried by said base and rotatably connected to said horizontal connecting bar for vertically adjusting said U-shaped members, an inverted L-shaped bracket formed with a tubular vertical side, an upright supporting bar fixed to said base and loosely engaging in said tubular vertical side, means locking said bracket in vertically adjusted position, and a pair of door clamping jaws carried by the upper horizontal side of said bracket.

2. A rack for use in hanging and removing vehicle doors, comprising a wheeled base formed of a pair of inverted U-shaped bars, casters carried by the lower ends of said bars, a pair of outer connecting bars fixed between the bights of said inverted U-shaped bars, an intermediate connecting bar fixed between the bights of said inverted U-shaped bars, a pair of upright guides carried by each outer connecting bar, a pair of door supporting members each formed of a pair of upright tubes slidably telescoping said guides, a horizontal connecting bar fixed between the lower ends of said tubes, a ribbed cushion on the upper side of said horizontal bar, a screw shaft for each supporting member threaded through an outer connecting bar and swivelly connected with said horizontal connecting bar, a vertical rod fixed to said intermediate bar, an inverted L-shaped bracket having a tubular vertical side telescoping said vertical rod, means securing said vertical side in adjusted position, a fixed clamping jaw carried by the horizontal side of said L-shaped member, and an adjustable clamping jaw carried by said horizontal side of said L-shaped member confronting said fixed jaw.

References Cited in the file of this patent
UNITED STATES PATENTS

| | | |
|---|---|---|
| 1,305,322 | Towler | June 3, 1919 |
| 1,374,986 | Carter | Apr. 19, 1921 |
| 1,802,227 | Welter | Apr. 21, 1931 |
| 1,820,263 | Williams | Aug. 25, 1931 |
| 2,232,744 | Thames | Feb. 25, 1941 |
| 2,516,260 | Schildmeier | July 25, 1950 |